UNITED STATES PATENT OFFICE.

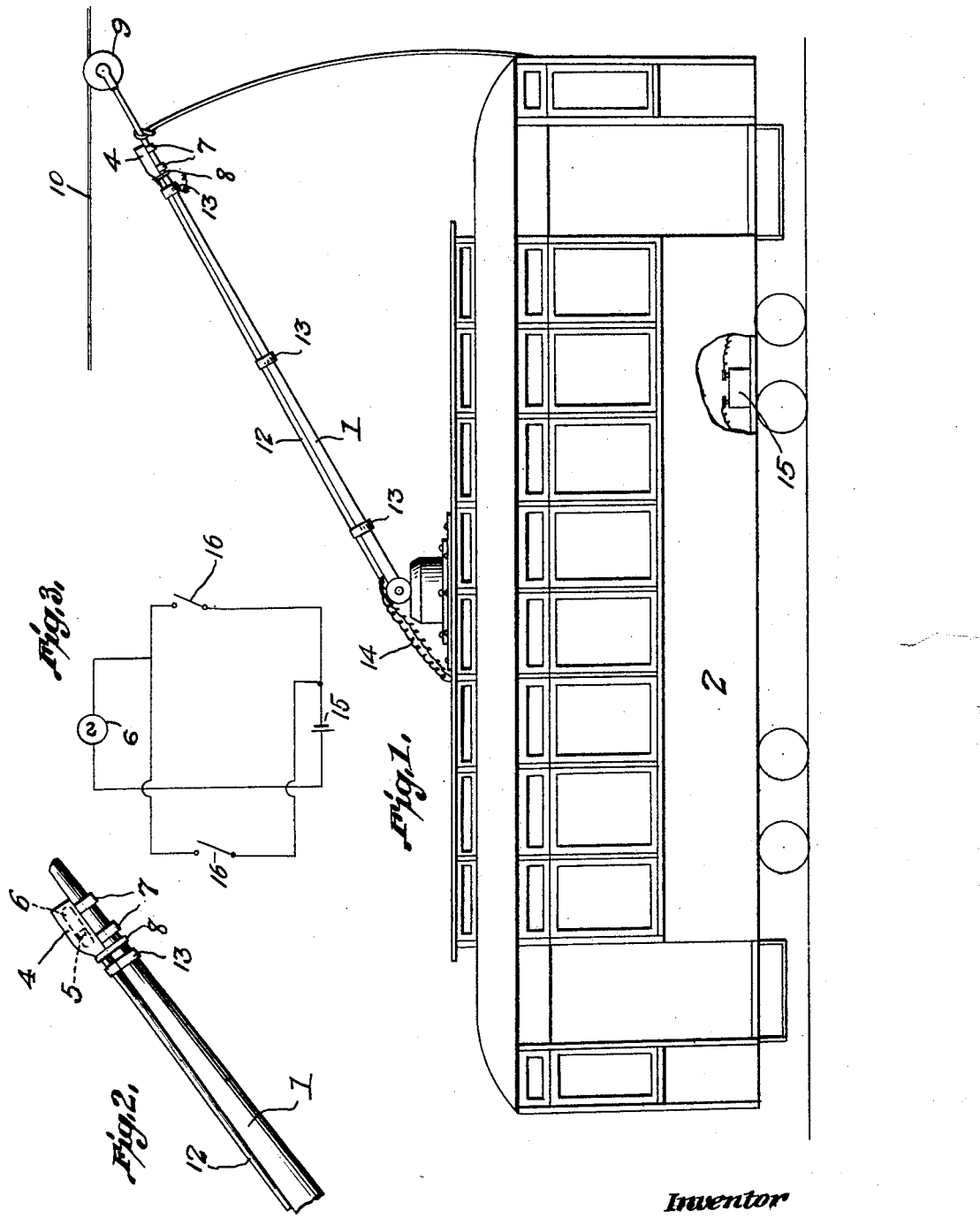

WILLIE KLUTZ DILLARD, OF LAURENS, SOUTH CAROLINA.

LIGHTING DISPLACED TROLLEY POLES.

1,403,743.

Specification of Letters Patent.   Patented Jan. 17, 1922.

Application filed September 19, 1921.   Serial No. 501,618.

*To all whom it may concern:*

Be it known that I, WILLIE KLUTZ DILLARD, a citizen of the United States, residing at Laurens, in the county of Laurens and the State of South Carolina, have invented certain new and useful Improvements in Lighting Displaced Trolley Poles, of which the following is a specification.

My invention relates to improvements in lighting electric cars and its object is to provide a means whereby the trolley wheel and wire may be readily lighted when desired, or at any other time when trolley wheel and the wire upon which the trolley wheel runs or is in contact or when trolley wheel and wire are disconnected.

I attain this object by the mechanism illustrated in the accompanying drawing.

Figure 1 shows my invention in use on a street car a portion of the car being broken away to show the batteries.

Figure 2 shows an enlarged detail of the lighting bulb and its attachment to trolley pole.

Figure 3 shows an illustrative diagram of the electric circuit connecting the lighting bulb with the battery, and showing the operating switches.

Similar numbers refer to similar parts throughout the figures of the drawing.

1 designates a trolley pole attached in the usual manner to the roof of the car 2.

4 indicates the lighting device as a whole said device including an electric bulb 6 having a socket 5 for attachment to the current wire. Said device is secured to the trolley pole near its end by clamps 7 and at its lower end where it is attached to the top of the conduit 12 by a clamp 8. The ordinary form of trolley wheel 9 is shown making contact with the usual trolley wire 10.

The conduit 12 is clamped to the trolley pole 1 by clamps 13 of the usual or any common form. 14 designates current wire connecting the light with battery 15.

The current wire 14 may have and preferably has switches 16 arranged one at each end of the car convenient to the motorman.

A shield 4 is open at its upper end so that rays of light from bulb 6 are thrown directly upon trolley wheel 9, hence if the trolley wheel leaves trolley wire the motorman throws the current switch 16 which cuts the bulb in circuit with the battery and illuminates the trolley wheel and its immediate vicinity, thus avoiding the necessity of trying to find the trolley wire 10 in the dark and saving much time and inconvenience.

Having thus fully described my invention what I claim as new and desire to secure by Letters Patent of the United States is—

In combination with a trolley pole and an electric battery, an electric bulb attached to the trolley pole, a protective shield for said bulb attached to the trolley pole, an electric circuit including said bulb and battery, and a switch at either end of the car to complete said circuit which switch may open or close said circuit, substantially as and for the purposes set forth.

WILLIE KLUTZ DILLARD.